(12) United States Patent
Wang

(10) Patent No.: US 9,547,787 B2
(45) Date of Patent: Jan. 17, 2017

(54) FINGERPRINT IDENTIFICATION UNIT AND DEVICE

(71) Applicant: MiiCs & Partners Inc., Road Town (VG)

(72) Inventor: Juan Wang, Shenzhen (CN)

(73) Assignee: MiiCs & Partners Inc., Road Town (VG)

( * ) Notice: Subject to any disclaimer, the term of this patent is extended or adjusted under 35 U.S.C. 154(b) by 102 days.

(21) Appl. No.: 14/555,723

(22) Filed: Nov. 28, 2014

(65) Prior Publication Data

US 2016/0148033 A1  May 26, 2016

(30) Foreign Application Priority Data

Nov. 24, 2014 (CN) .......................... 2014 1 0678940

(51) Int. Cl.
*G06K 9/00* (2006.01)

(52) U.S. Cl.
CPC .................................. *G06K 9/0002* (2013.01)

(58) Field of Classification Search
CPC  G06K 9/0002; G06K 9/0004; G06K 9/00053; G07C 9/00563
USPC ................ 382/124, 100, 126, 115, 116, 312, 103,382/313
See application file for complete search history.

(56) References Cited

U.S. PATENT DOCUMENTS

| | | | | |
|---|---|---|---|---|
| 5,673,041 | A * | 9/1997 | Chatigny | H03K 17/94 178/18.04 |
| 7,400,750 | B2 * | 7/2008 | Nam | G06K 9/0002 382/124 |
| 7,558,410 | B2 * | 7/2009 | Schneider | G06K 9/00919 382/126 |
| 8,666,126 | B2 * | 3/2014 | Lee | G06K 9/0012 382/124 |
| 8,724,859 | B2 * | 5/2014 | Schneider | G06K 9/0002 382/124 |
| 8,773,367 | B2 * | 7/2014 | Han | G06F 3/0436 178/18.04 |
| 9,170,668 | B2 * | 10/2015 | Schneider | G06F 3/041 |
| 2014/0354596 | A1 * | 12/2014 | Djordjev | G06K 9/0002 345/175 |

* cited by examiner

*Primary Examiner* — Sheela C Chawan
(74) *Attorney, Agent, or Firm* — Zhigang Ma

(57) ABSTRACT

The present disclosure provides a fingerprint identification unit. The fingerprint identification unit includes a substrate, a reception layer, a first electrode layer, a transmission layer, a second electrode layer, and a third electrode layer. The reception layer is positioned at one side of the substrate. The first electrode layer is formed on the reception layer. The transmission layer is positioned at another side of the substrate opposite to the reception layer. The second electrode layer and the third electrode layer are formed on two opposite sides of the transmission layer respectively. The reception layer and the transmission layer are made of piezoelectric materials. At least one of the first electrode layer, the second electrode layer, and the third electrode layer is a transparent conductive layer.

19 Claims, 15 Drawing Sheets

FINGERPRINT IDENTIFICATION UNIT AND DEVICE

CROSS-REFERENCE TO RELATED APPLICATIONS

This application claims priority to Chinese Patent Application No. 201410678940.6 filed on Nov. 24, 2014 in the China Intellectual Property Office, the contents of which are incorporated by reference herein.

FIELD

The subject matter herein generally relates to a fingerprint identification unit and a fingerprint identification device.

BACKGROUND

Fingerprint identification devices may be classified into an ultrasonic type, an infrared type, a capacitive type, or the like, according to an operational principle thereof. A traditional ultrasonic fingerprint identification device may include a substrate, piezoelectric elements formed on the substrate, and electrodes formed on the piezoelectric elements. However, some particles or bubbles may be generated in the ultrasonic fingerprint identification device during manufacture processes.

BRIEF DESCRIPTION OF THE DRAWINGS

Implementations of the present technology will now be described, by way of example only, with reference to the attached figures.

DETAILED DESCRIPTION

Figure 1:
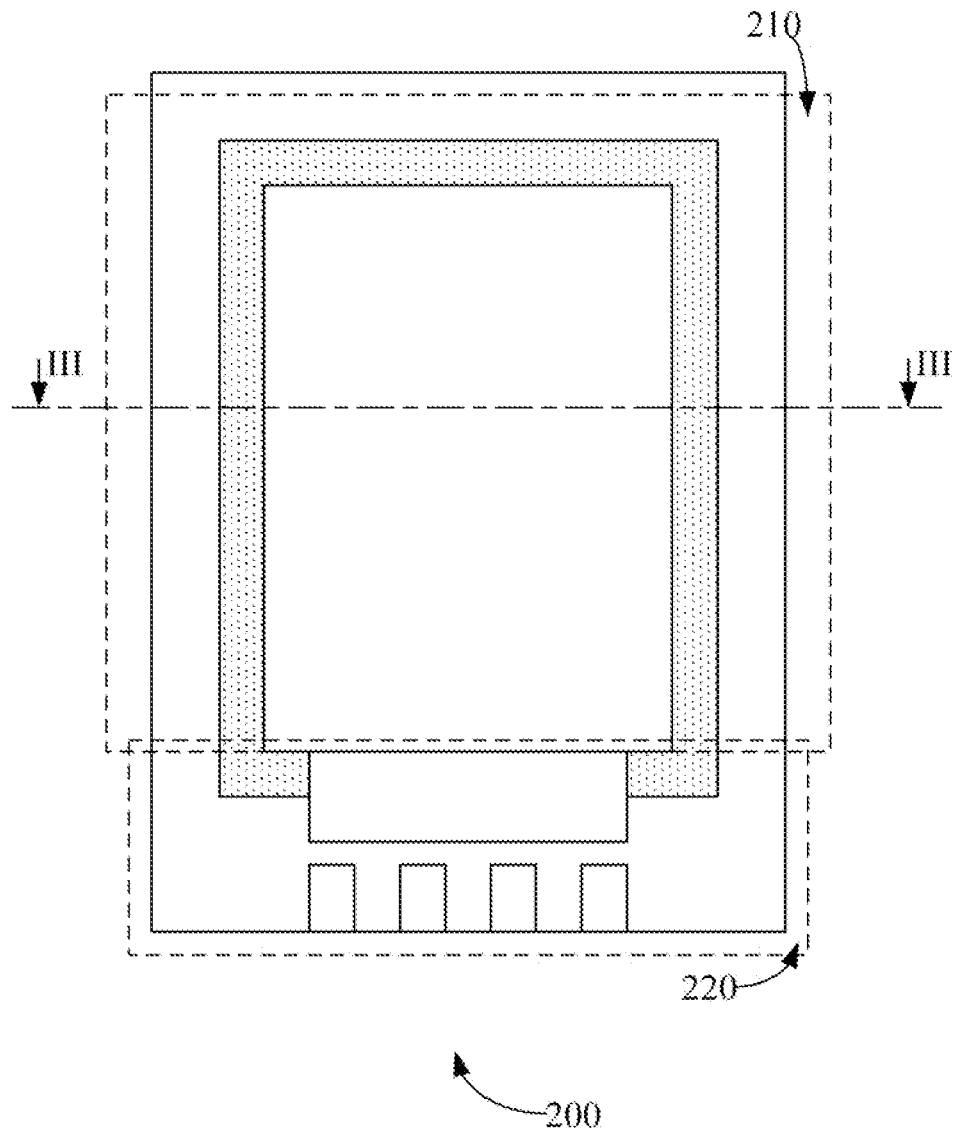
FIG. 1 is a top view of a first embodiment of a fingerprint identification device, wherein the fingerprint identification device includes a fingerprint identification unit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 is a top view of a first embodiment of a fingerprint identification device 200. Referring to FIG. 1, the fingerprint identification device 200 includes a fingerprint identification unit 210 and a connection pad 220. The connection pad 220 is coupled with the fingerprint identification unit 210. The fingerprint identification unit 210 identifies a finger print applied on the fingerprint identification unit 210. The connection pad 220 is coupled between the fingerprint identification unit 210 and external circuits.

Figure 2:
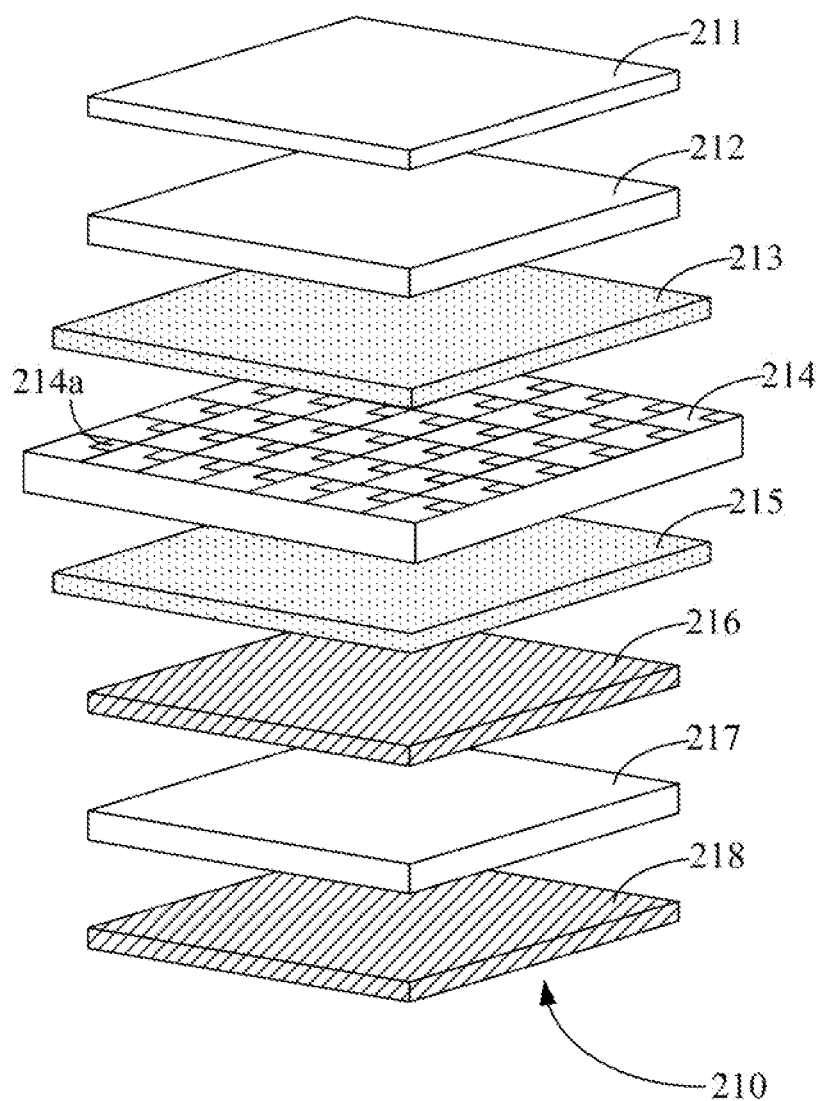
FIG. 2 is an exploded view of the fingerprint identification unit of FIG. 1.
Figure 3:
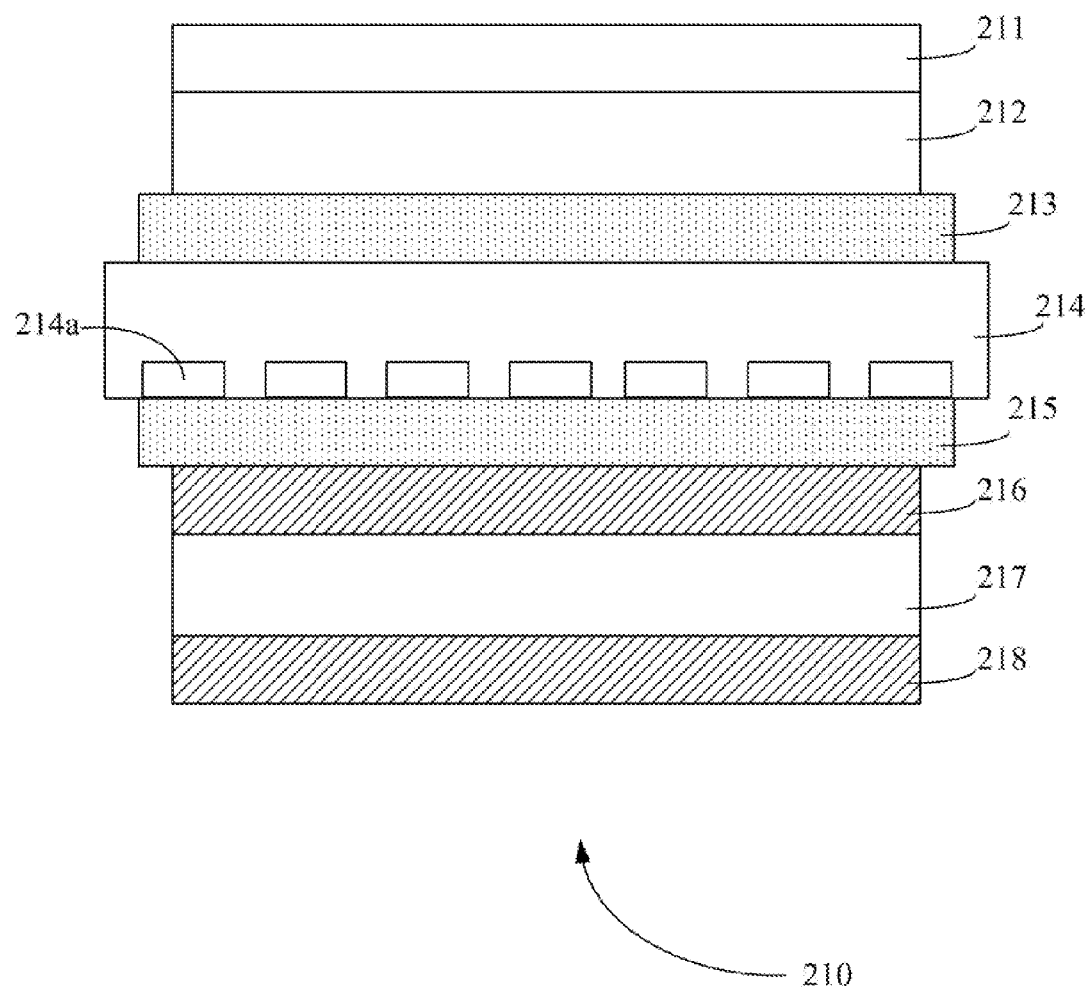
FIG. 3 is a cross-sectional view of the fingerprint identification device of FIG. 1, taken along line III-III.

Referring FIGS. 2 and 3, the fingerprint identification unit 210 includes a first electrode layer 211, a reception layer 212, a first adhesion layer 213, a substrate 214, a second adhesion layer 215, a second electrode layer 216, a transmission layer 217, and a third electrode layer 218 successively stacked. The reception layer 212 is adhered to the substrate 214 via the first adhesion layer 213. The transmission layer 217 is adhered to the substrate 214 opposite to the reception layer 212 via the second adhesion layer 215. The substrate 214 includes a number of transistors 214a.

The second electrode layer 216 and the third electrode layer 218 are positioned at two opposite sides of the transmission layer 217 respectively. The transmission layer 217 is a piezoelectric layer. In this embodiment, the transmission layer 217 is made of PVDF (Polyvinylidene Fluoride). The second electrode layer 216 and the third electrode layer 218 apply voltage to the transmission layer 217. The transmission layer 217 vibrates and generates acoustic wave under the voltage. In this embodiment, the acoustic wave is ultrasonic wave.

The first electrode 211 is formed on the reception layer 212. The reception layer 212 is a piezoelectric layer. In this embodiment, the reception layer 212 is made of PVDF (Polyvinylidene Fluoride). The reception layer 212 receives an acoustic wave reflected by a finger put on the fingerprint identification unit 210 and generates electrical signal according to the acoustic wave. The first electrode 211 transmits the electrical signal to the transistors 214a. The transistors 214a receive the electrical signal from the first electrode 211, and make finger images according to the electrical signal.

While the fingerprint identification unit 210 works, the second electrode layer 216 and the third electrode layer 218 apply voltage to the transmission layer 217, then the transmission layer 217 vibrates under the voltage and generates acoustic wave. When a finger is put on the fingerprint identification unit 210, the acoustic wave is reflected by the finger and transmits to the reception layer 212. The reception layer 212 generates electrical signal according to the reflected acoustic wave and transmits the electrical signal to the transistors 214a, and then the transistors 214a obtain finger images according to the electrical signal.

In this embodiment, the first electrode layer 211 is a transparent conductive layer. Particularly, the first electrode layer 211 can be made of monolayer transparent conducting materials or multilayer transparent conducting materials. The monolayer transparent conducting material includes ITO (Indium Tin Oxide), ZnO (Zinc Oxide), PEDOT (Poly-ethylenedioxythiophene), CNT (Carbon Nanotube), AgNW (Argentum Nano Wire), or graphene. The multilayer transparent conducting material includes a multilayer structure with successively stacked ITO, Argentums, and ITO. The first electrode layer 211 is formed on the reception layer 212. The second electrode layer 216 and the third electrode layer 218 are made of opacity conducting material, such as Argentums. The second electrode layer 216 and the third electrode layer 218 are positioned at two opposite sides of the transmission layer 217 respectively. In this embodiment, a luminousness of the first electrode layer 211 is between 10% and 99%, and an impedance of the first electrode layer 211 is less than 150 Ohm.

Because the first electrode layer 211 is a transparent layer, a manufacturer can easily see the particles and bubbles inside the fingerprint identification unit 210, and then remove the particles and bubbles by suitable means.

Figure 4:
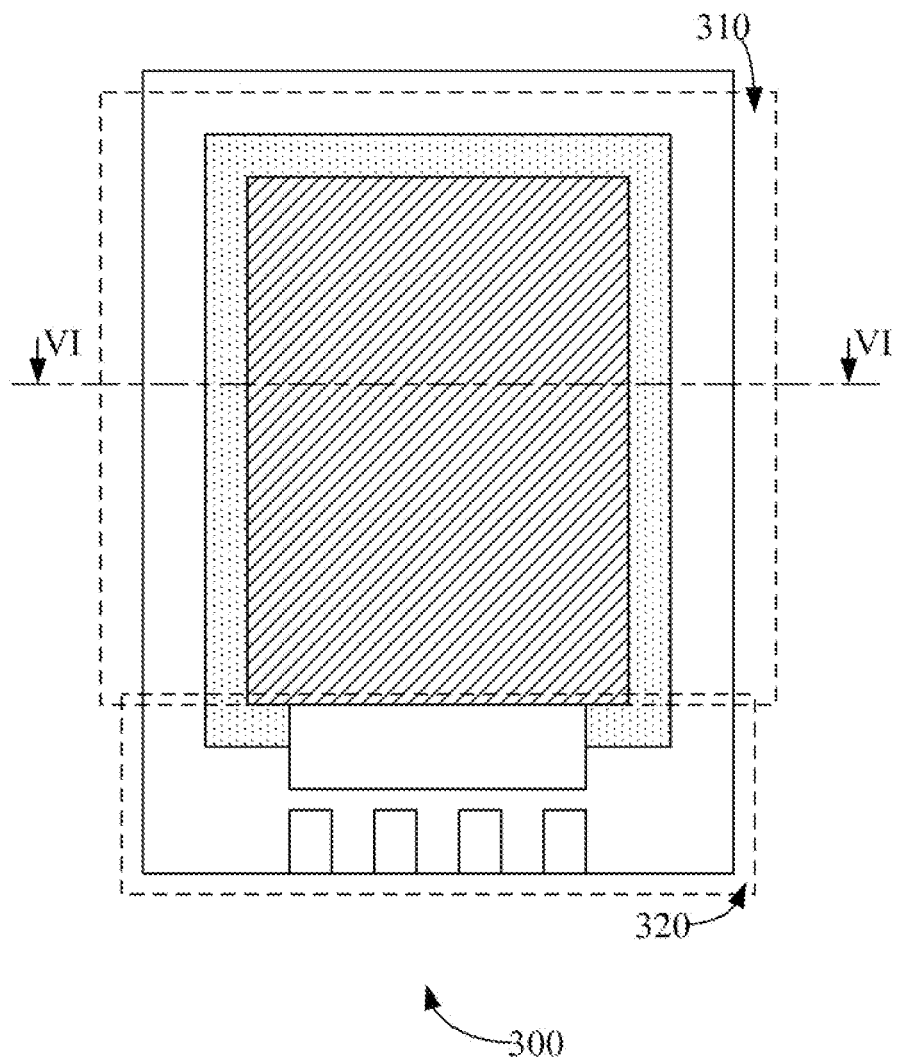
FIG. 4 is a top view of a second embodiment of a fingerprint identification device, wherein the fingerprint identification device includes a fingerprint identification unit.

FIG. 4 is a top view of a second embodiment of a fingerprint identification device 300. Referring to FIG. 4, the fingerprint identification device 300 includes a fingerprint identification unit 310 and a connection pad 320. The connection pad 320 is coupled with the fingerprint identification unit 310. The fingerprint identification unit 310 identifies a finger print applied on the fingerprint identification unit 310. The connection pad 320 is coupled between the fingerprint identification unit 310 and external circuits.

Figure 5:
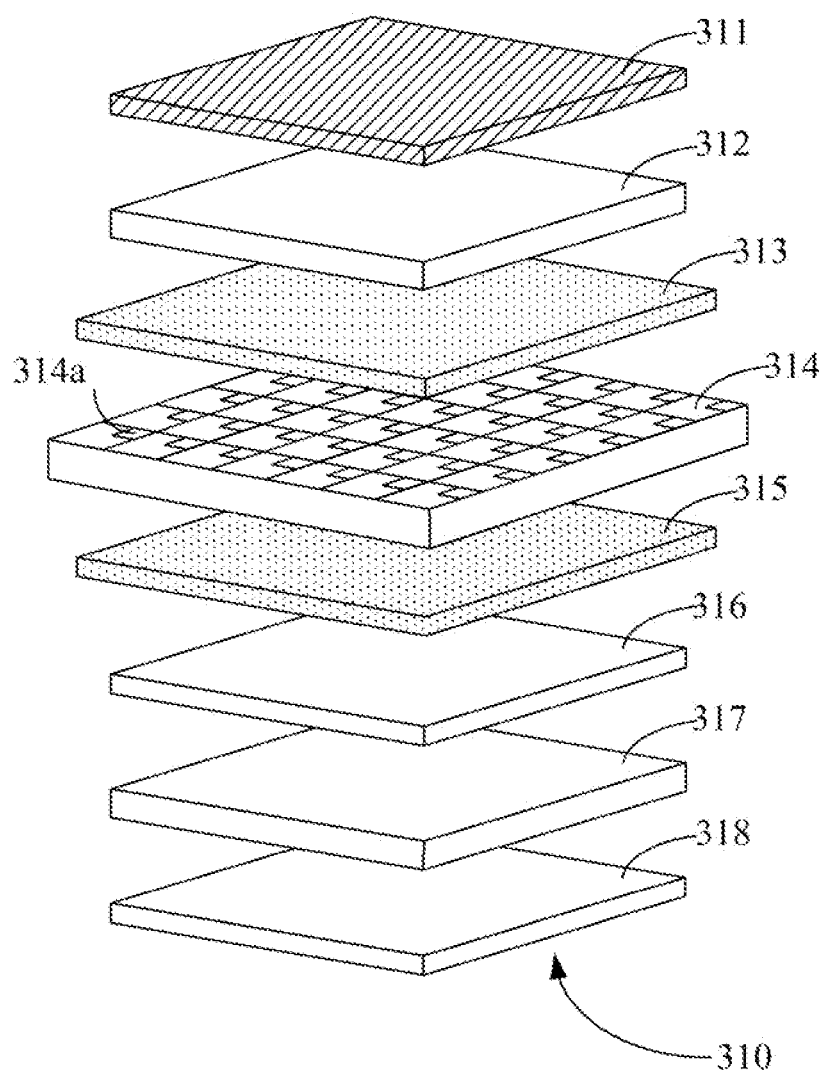
FIG. 5 is an exploded view of the fingerprint identification unit of FIG. 4.
Figure 6:
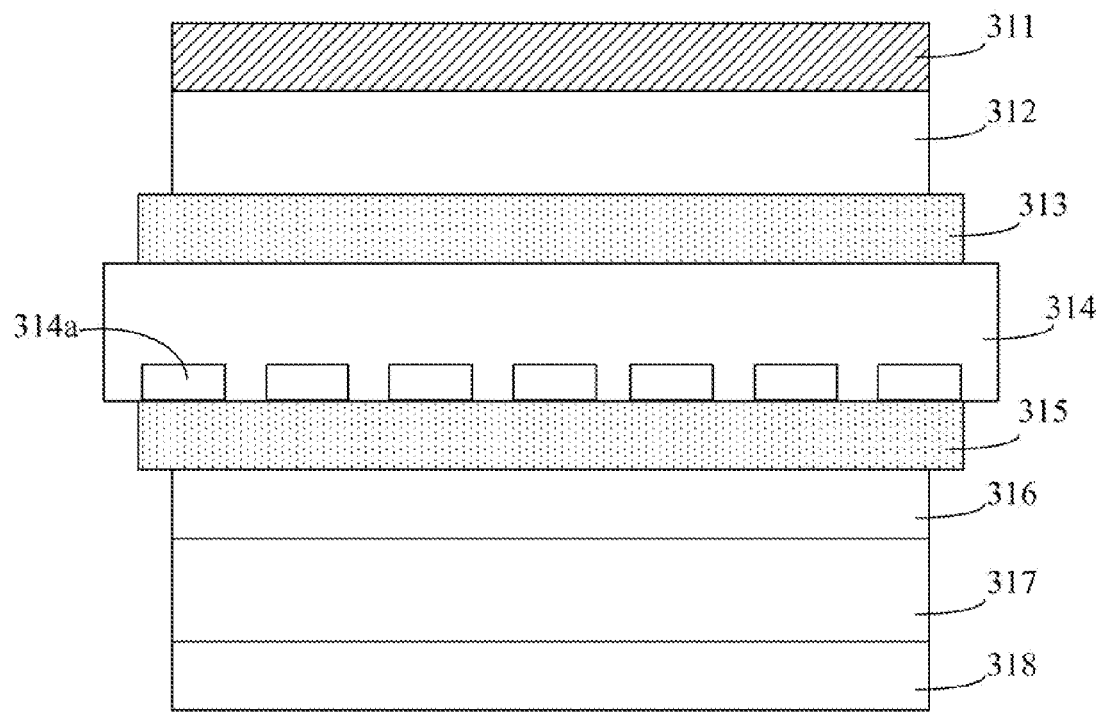
FIG. 6 is a cross-sectional view of the fingerprint identification device of FIG. 4, taken along line VI-VI.

Referring FIGS. 5 and 6, the fingerprint identification unit 310 includes a first electrode layer 311, a reception layer 312, a first adhesion layer 313, a substrate 314, a second adhesion layer 315, a second electrode layer 316, a transmission layer 317, and a third electrode layer 318. The reception layer 312 is adhered to the substrate 314 via the first adhesion layer 313. The transmission layer 317 is adhered to the substrate 314 opposite to the reception layer 312 via the second adhesion layer 315. The substrate 214 includes a number of transistors 314a.

The second electrode layer 316 and the third electrode layer 318 are positioned at two opposite sides of the transmission layer 317 respectively. The transmission layer 317 is a piezoelectric layer. In this embodiment, the transmission layer 317 is made of PVDF (Polyvinylidene Fluoride). The second electrode layer 316 and the third electrode layer 318 apply voltage to the transmission layer 317. The transmission layer 317 vibrates and generates acoustic wave under the voltage. In this embodiment, the acoustic wave is ultrasonic wave.

The first electrode 311 is formed on the reception layer 312. The reception layer 312 is a piezoelectric layer. In this embodiment, the reception layer 312 is made of PVDF (Polyvinylidene Fluoride). The reception layer 312 receives an acoustic wave reflected by a finger put on the fingerprint identification unit 310 and generates electrical signal according to the acoustic wave. The first electrode 311 transmits the electrical signal to the transistors 314a. The transistors 314a receive the electrical signal from the first electrode 311, and make finger images according to the electrical signal.

While the fingerprint identification unit 310 works, the second electrode layer 316 and the third electrode layer 318 apply voltage to the transmission layer 317, then the transmission layer 317 vibrates under the voltage and generates acoustic wave. When a finger is put on the fingerprint identification unit 310, the acoustic wave is reflected by the finger and transmits to the reception layer 312. The reception layer 312 generates electrical signal according to the reflected acoustic wave and transmits the electrical signal to the transistors 314a, and then the transistors 314a obtain finger images according to the electrical signal.

In this embodiment, the first electrode layer 311 is made of opacity conducting material, such as Argentums. The first electrode layer 311 is formed on the reception layer 312. The second electrode layer 316 and the third electrode layer 318 are transparent conductive layers. Particularly, the second electrode layer 316 and the third electrode layer 318 can be made of monolayer transparent conducting material or a multilayer transparent conducting material. The monolayer transparent conducting material includes ITO (Indium Tin Oxide), ZnO (Zinc Oxide), PEDOT (Poly-ethylenedioxythiophene), CNT (Carbon Nanotube), AgNW (Argentum Nano Wire), or graphene. The multilayer transparent conducting material includes a multilayer structure with successively stacked ITO, Argentums, and ITO. The second electrode layer 316 and the third electrode layer 318 are positioned at two opposite sides of the transmission layer 317 respectively. In this embodiment, a luminousness of each of the second electrode layer 316 and the third electrode layer 318 are between 10% and 99%, and an impedance of each of the second electrode layer 316 and the third electrode layer 318 are less than 150 Ohm.

Because the second electrode layer 316 and the third electrode layer 318 are transparent layers, a manufacturer can easily see the particles and bubbles inside the fingerprint identification unit 310, and then remove the particles and bubbles by suitable means.

Figure 7:
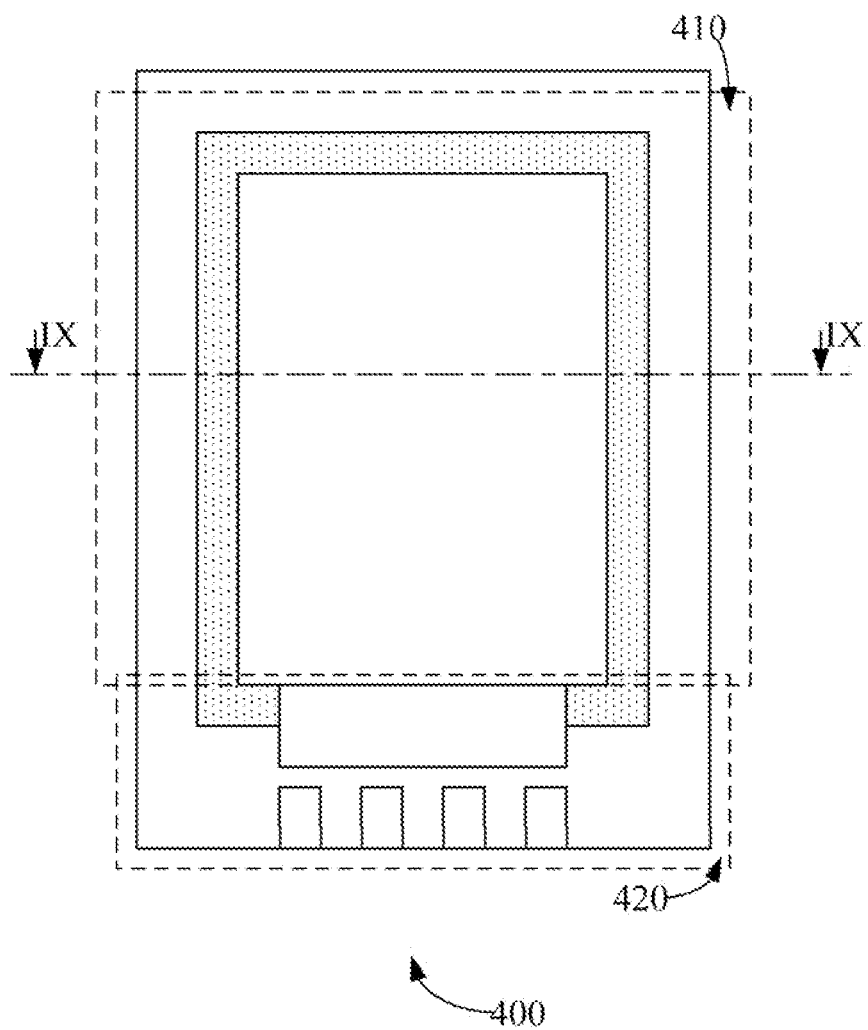
FIG. 7 is a top view of a third embodiment of a fingerprint identification device, wherein the fingerprint identification device includes a fingerprint identification unit.

FIG. 7 is a top view of a third embodiment of a fingerprint identification device 400. Referring to FIG. 7, the fingerprint identification device 400 includes a fingerprint identification unit 410 and a connection pad 420. The connection pad 420 is coupled with the fingerprint identification unit 410. The fingerprint identification unit 410 identifies a finger print applied on the fingerprint identification unit 410. The connection pad 420 is coupled between the fingerprint identification unit 410 and external circuits.

Figure 8:
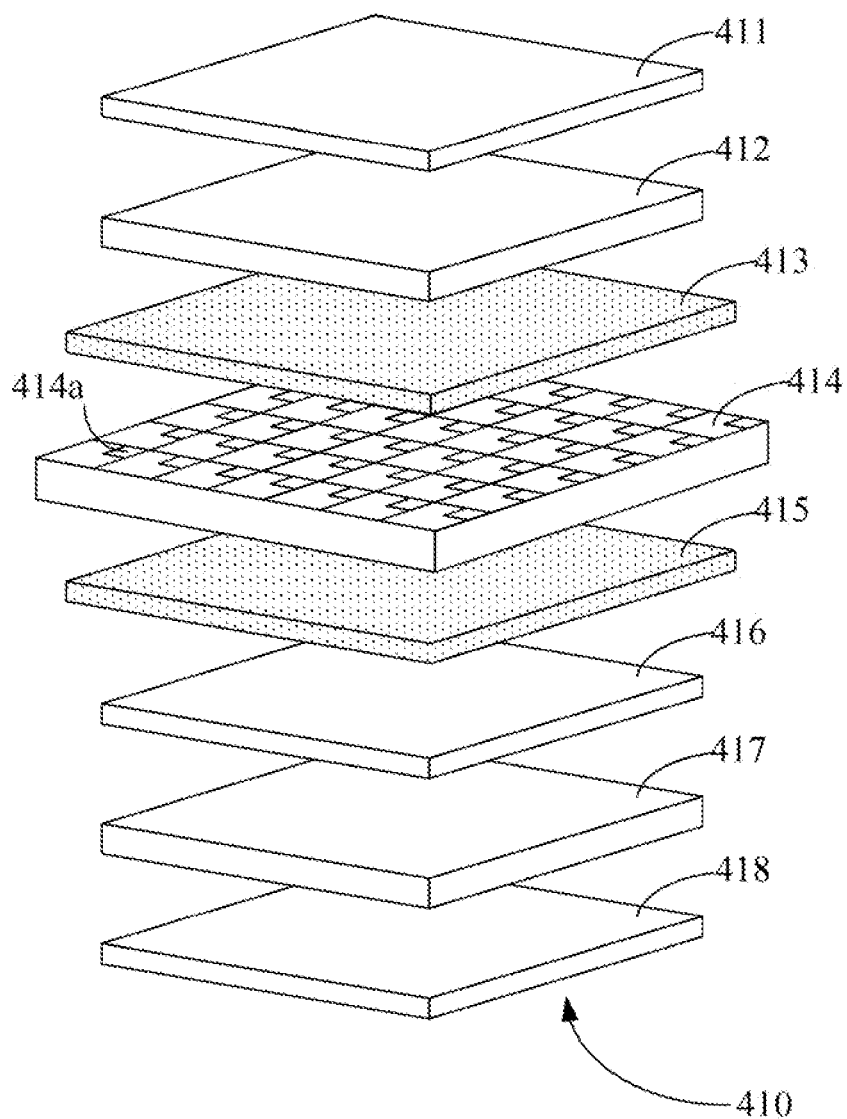
FIG. 8 is an exploded view of the fingerprint identification unit of FIG. 7.
Figure 9:
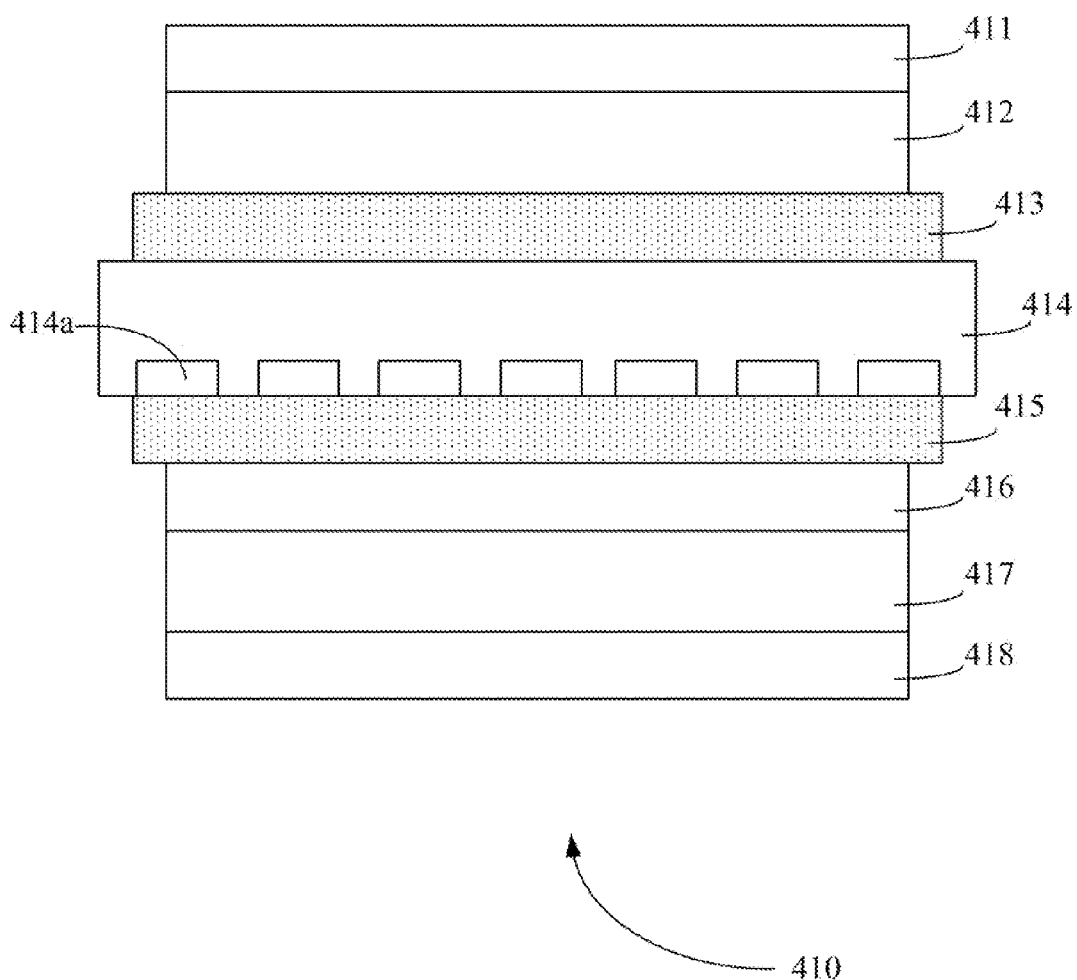
FIG. 9 is a cross-sectional view of the fingerprint identification device of FIG. 7, taken along line IX-IX.

Referring FIGS. 8 and 9, the fingerprint identification unit 410 includes a first electrode layer 411, a reception layer 412, a first adhesion layer 413, a substrate 414, a second adhesion layer 415, a second electrode layer 416, a transmission layer 417, and a third electrode layer 418. The reception layer 412 is adhered to the substrate 414 via the first adhesion layer 413. The transmission layer 417 is adhered to the substrate 414 opposite to the reception layer 412 via the second adhesion layer 415. The substrate 414 includes a number of transistors 414a.

The second electrode layer 416 and the third electrode layer 418 are positioned at two opposite sides of the transmission layer 417 respectively. The transmission layer 417 is a piezoelectric layer. In this embodiment, the transmission layer 417 is made of PVDF (Polyvinylidene Fluoride). The second electrode layer 416 and the third electrode layer 418 apply voltage to the transmission layer 417. The transmission layer 417 vibrates and generates acoustic wave under the voltage. In this embodiment, the acoustic wave is ultrasonic wave.

The first electrode 411 is formed on the reception layer 412. The reception layer 412 is a piezoelectric layer. In this embodiment, the reception layer 412 is made of PVDF (Polyvinylidene Fluoride). The reception layer 412 receives an acoustic wave reflected by a finger put on the fingerprint identification unit 410 and generates electrical signal according to the acoustic wave. The first electrode 411 transmits the electrical signal to the transistors 414a. The transistors 414a receive the electrical signal from the first electrode 411, and make finger images according to the electrical signal.

While the fingerprint identification unit 410 works, the second electrode layer 416 and the third electrode layer 418 apply voltage to the transmission layer 417, then the transmission layer 417 vibrates under the voltage and generates acoustic wave. When a finger is put on the fingerprint identification unit 410, the acoustic wave is reflected by the finger and transmits to the reception layer 412. The reception layer 412 generates electrical signal according to the reflected acoustic wave and transmits the electrical signal to the transistors 414a, and then the transistors 414a obtain finger images according to the electrical signal.

In this embodiment, the first electrode layer 411, second electrode layer 416, and the third electrode layer 418 are transparent conductive layers. Particularly, the first electrode layer 411, second electrode layer 416, and the third electrode layer 418 can be made of monolayer transparent conducting materials or multilayer transparent conducting materials. The monolayer transparent conducting material includes ITO (Indium Tin Oxide), ZnO (Zinc Oxide), PEDOT (Poly-ethylenedioxythiophene), CNT (Carbon Nanotube), AgNW (Argentum Nano Wire), or graphene. The multilayer transparent conducting material includes a multilayer structure with successively stacked ITO, Argentums, and ITO. The first electrode layer 411 is formed on the reception layer 412. The second electrode layer 416 and the third electrode layer 418 are positioned at two opposite sides of the transmission layer 417 respectively. In this embodiment, a luminousness of each of the first electrode layer 411, second electrode layer 416, and the third electrode layer 418 is between 10% and 99%, and an impedance of each of the first electrode layer 411, second electrode layer 416, and the third electrode layer 418 is less than 150 Ohm.

Because the first electrode layer 411 is a transparent layer, a manufacturer can easily see the particles and bubbles inside the fingerprint identification unit 410, and then remove the particles and bubbles by suitable means.

Figure 10:
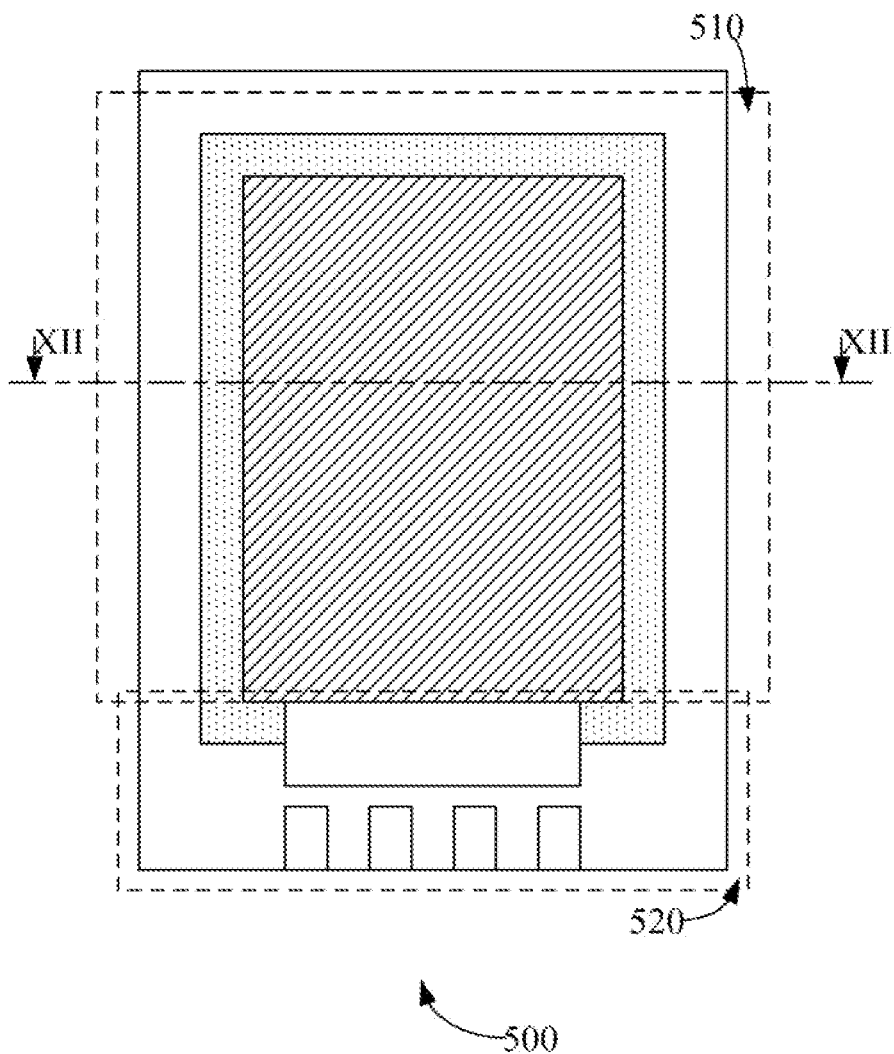
FIG. 10 is a top view of a fourth embodiment of a fingerprint identification device, wherein the fingerprint identification device includes a fingerprint identification unit.

FIG. 10 is a top view of a fourth embodiment of a fingerprint identification device 500. Referring to FIG. 10, the fingerprint identification device 500 includes a fingerprint identification unit 510 and a connection pad 520. The connection pad 520 is coupled with the fingerprint identification unit 510. The fingerprint identification unit 510 identifies a finger print applied on the fingerprint identification unit 510. The connection pad 520 is coupled between the fingerprint identification unit 510 and external circuits.

Figure 11:
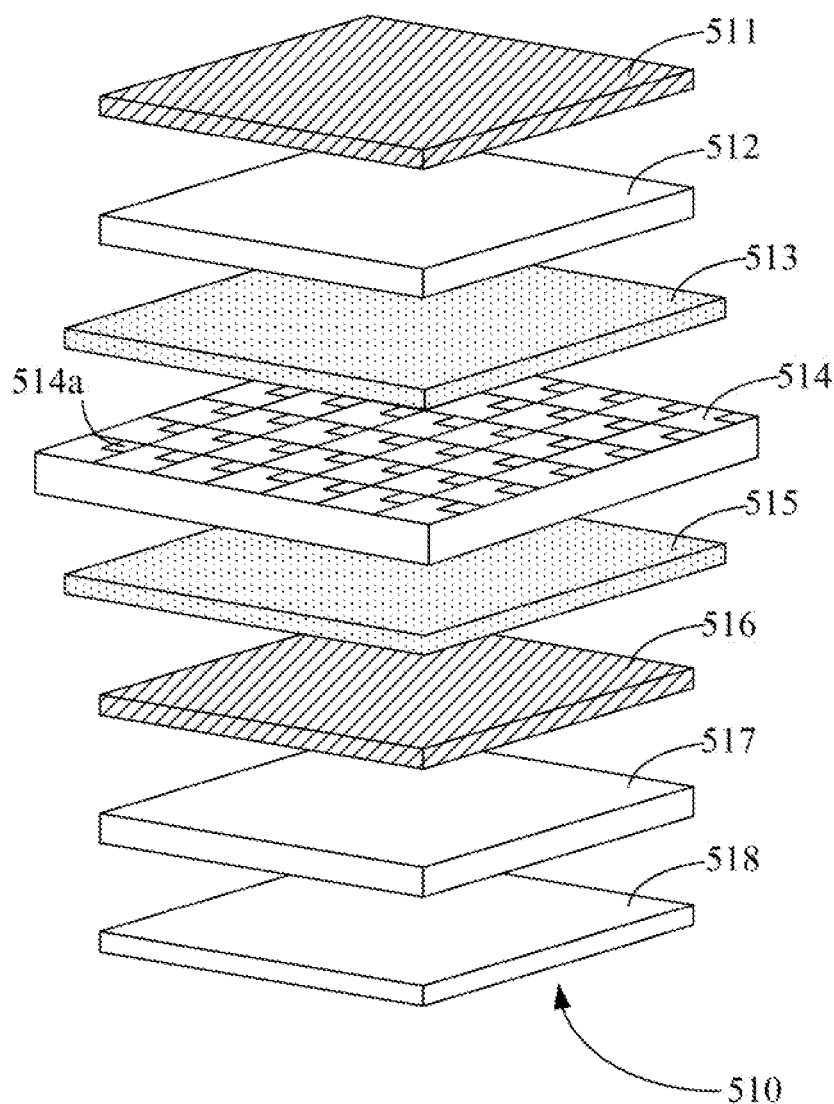
FIG. 11 is an exploded view of the fingerprint identification unit of FIG. 10.
Figure 12:
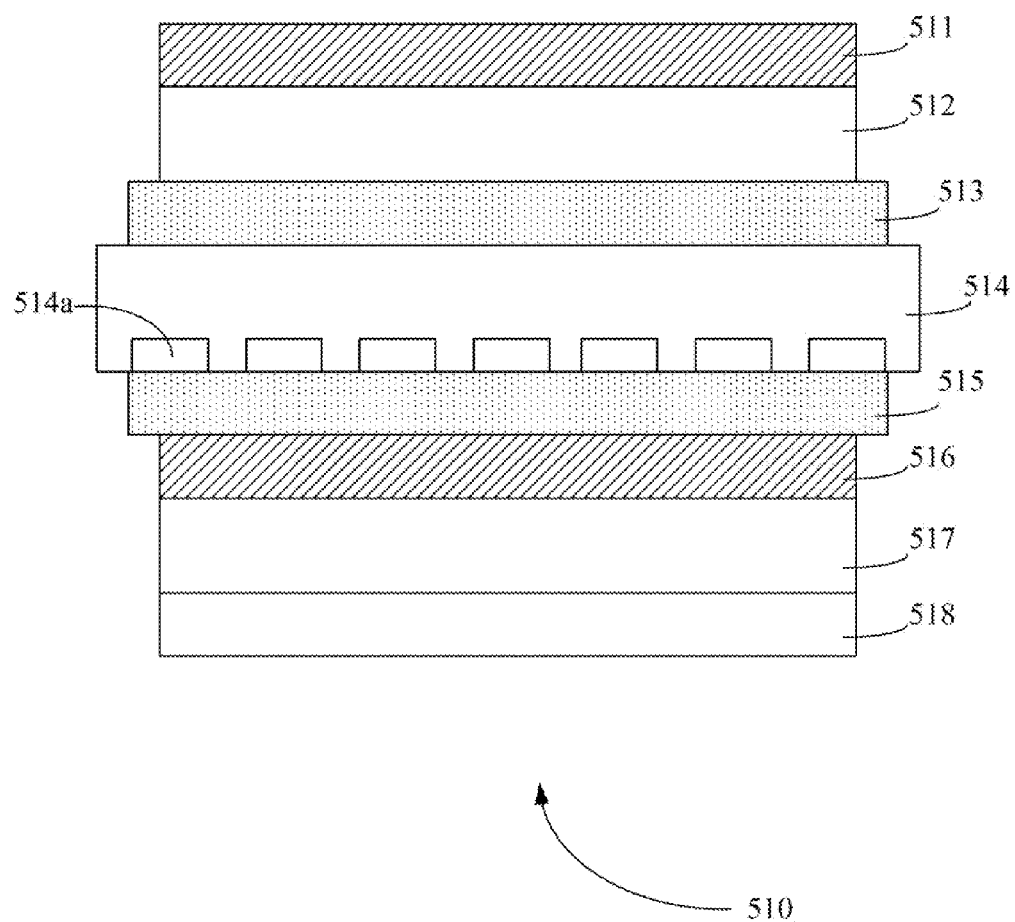
FIG. 12 is a cross-sectional view of the fingerprint identification device of FIG. 10, taken along line VII-VII.

Referring FIGS. 11 and 12, the fingerprint identification unit 510 includes a first electrode layer 511, a reception layer 512, a first adhesion layer 513, a substrate 514, a second adhesion layer 515, a second electrode layer 516, a transmission layer 517, and a third electrode layer 518. The reception layer 512 is adhered to the substrate 514 via the first adhesion layer 513. The transmission layer 517 is adhered to the substrate 514 opposite to the reception layer 512 via the second adhesion layer 515. The substrate 514 includes a number of transistors 514a.

The second electrode layer 516 and the third electrode layer 518 are positioned at two opposite sides of the transmission layer 517 respectively. The transmission layer 517 is a piezoelectric layer. In this embodiment, the transmission layer 517 is made of PVDF (Polyvinylidene Fluoride). The second electrode layer 516 and the third electrode layer 518 apply voltage to the transmission layer 517. The transmission layer 517 vibrates and generates acoustic wave under the voltage. In this embodiment, the acoustic wave is ultrasonic wave.

The first electrode 511 is formed on the reception layer 512. The reception layer 512 is a piezoelectric layer. In this embodiment, the reception layer 512 is made of PVDF (Polyvinylidene Fluoride). The reception layer 512 receives an acoustic wave reflected by a finger put on the fingerprint identification unit 510 and generates electrical signal according to the acoustic wave. The first electrode 511 transmits the electrical signal to the transistors 514a. The transistors 514a receive the electrical signal from the first electrode 511, and make finger images according to the electrical signal.

While the fingerprint identification unit 510 works, the second electrode layer 516 and the third electrode layer 518 apply voltage to the transmission layer 517, then the transmission layer 517 vibrates under the voltage and generates acoustic wave. When a finger is put on the fingerprint identification unit 510, the acoustic wave is reflected by the finger and transmits to the reception layer 512. The reception layer 512 generates electrical signal according to the reflected acoustic wave and transmits the electrical signal to the transistors 514a, and then the transistors 514a obtain finger images according to the electrical signal.

In this embodiment, the first electrode layer 511 and the second electrode layer 516 are transparent conductive layers. Particularly, the first electrode layer 511 and the second electrode layer 516 can be made of monolayer transparent conducting materials or multilayer transparent conducting materials. The monolayer transparent conducting material includes ITO (Indium Tin Oxide), ZnO (Zinc Oxide), PEDOT (Poly-ethylenedioxythiophene), CNT (Carbon Nanotube), AgNW (Argentum Nano Wire), or graphene. The multilayer transparent conducting material includes a multilayer structure with successively stacked ITO, Argentums, and ITO. The first electrode layer 511 is formed on the reception layer 512. The third electrode layer 518 is made of opacity conducting material, such as Argentums. The second electrode layer 516 and the third electrode layer 518 are positioned at two opposite sides of the transmission layer 517 respectively. In this embodiment, a luminousness of each of the first electrode layer 511 and the second electrode layer 516 is between 10% and 99%, and an impedance of each of the first electrode layer 511 is less than 150 Ohm.

Because the first electrode layer 511 and the second electrode layer 516 are transparent layers, a manufacturer can easily see the particles and bubbles inside the fingerprint identification unit 510, and then remove the particles and bubbles by suitable means.

Figure 13:
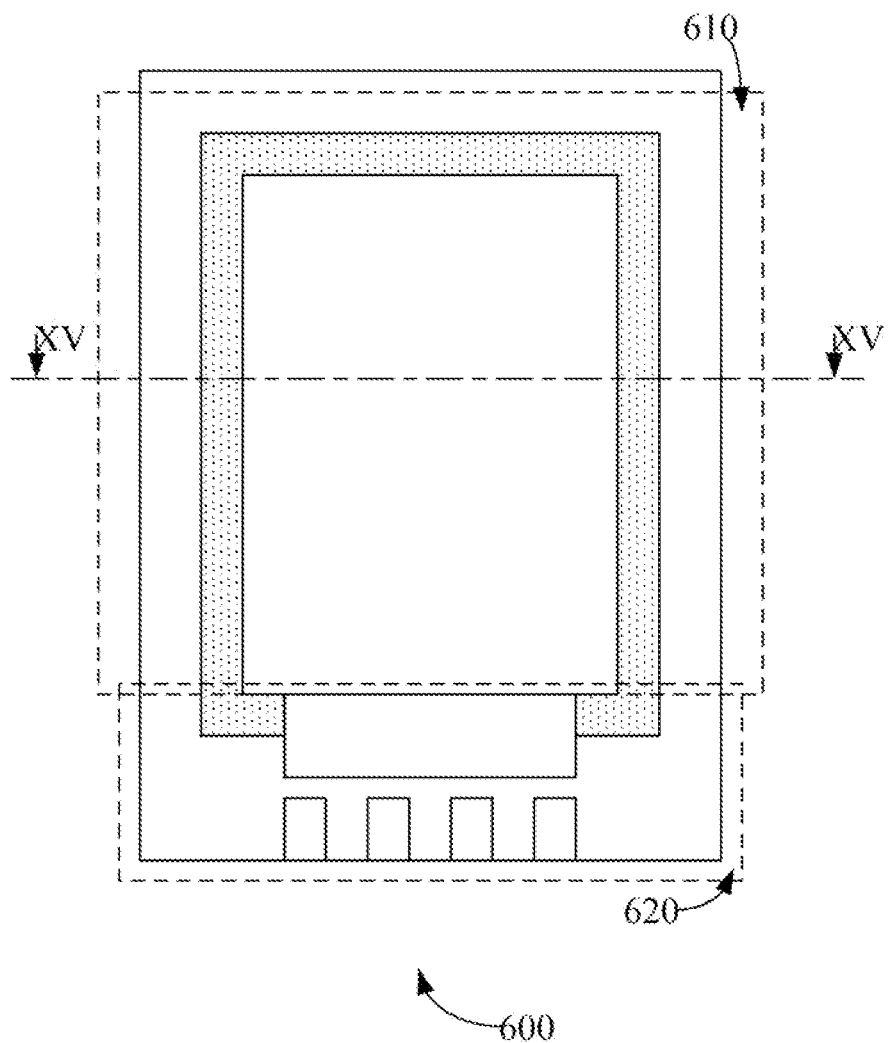
FIG. 13 is a top view of a fifth embodiment of a fingerprint identification device, wherein the fingerprint identification device includes a fingerprint identification unit.

FIG. 13 is a top view of a fifth embodiment of a fingerprint identification device 600. Referring to FIG. 13, the fingerprint identification device 600 includes a fingerprint identification unit 610 and a connection pad 620. The connection pad 620 is coupled with the fingerprint identification unit 610. The fingerprint identification unit 610 identifies a finger print applied on the fingerprint identification unit 610. The connection pad 620 is coupled between the fingerprint identification unit 610 and external circuits.

Figure 14:
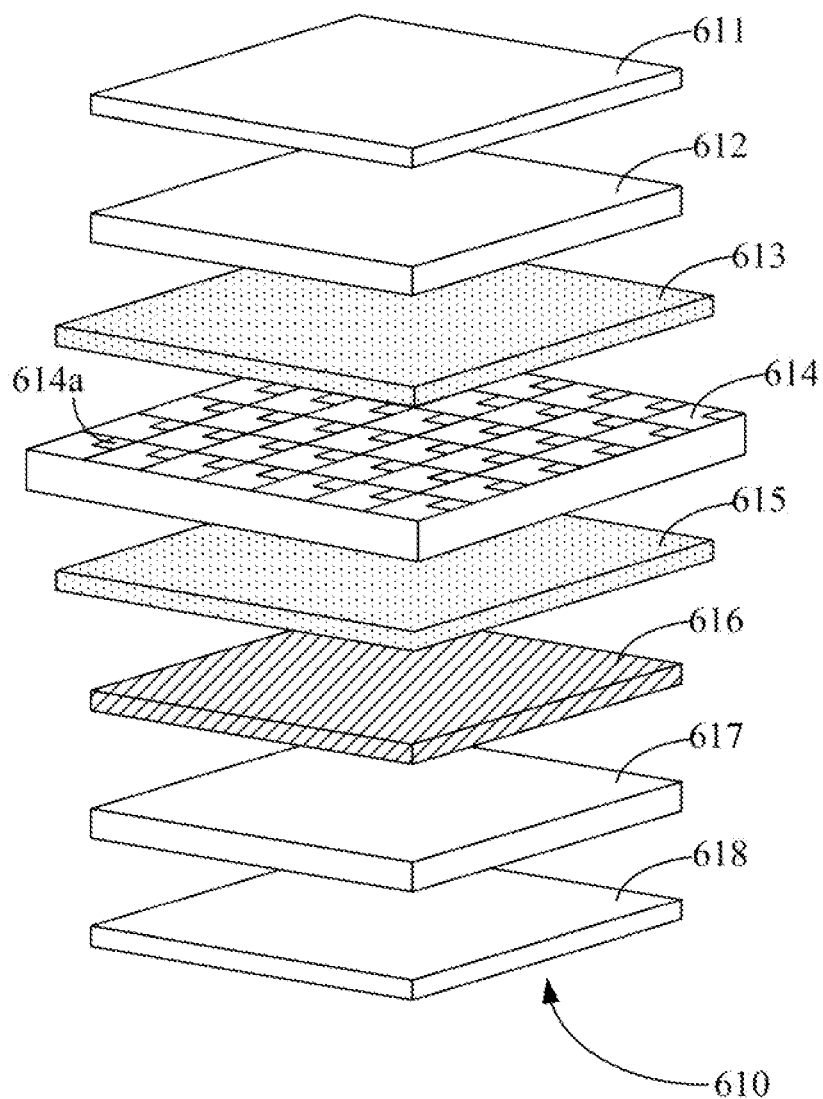
FIG. 14 is an exploded view of the fingerprint identification unit of FIG. 13.
Figure 15:
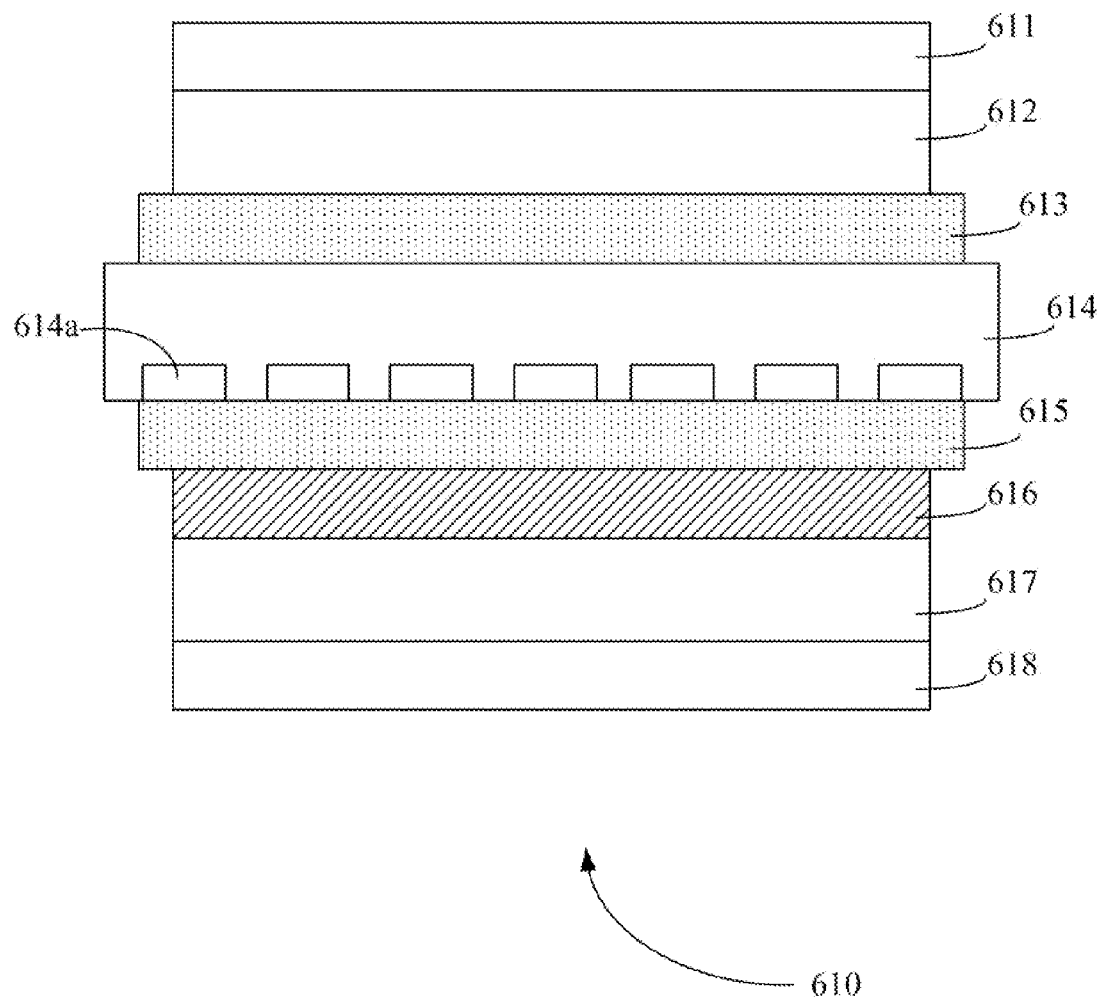
FIG. 15 is a cross-sectional view of the fingerprint identification device of FIG. 13, taken along line XV-XV.

Referring FIGS. 14 and 15, the fingerprint identification unit 610 includes a first electrode layer 611, a reception layer 612, a first adhesion layer 613, a substrate 614, a second adhesion layer 615, a second electrode layer 616, a transmission layer 617, and a third electrode layer 618. The reception layer 612 is adhered to the substrate 614 via the first adhesion layer 613. The transmission layer 617 is adhered to the substrate 614 opposite to the reception layer 612 via the second adhesion layer 615. The substrate 614 includes a number of transistors 614a.

The second electrode layer 616 and the third electrode layer 618 are positioned at two opposite sides of the transmission layer 617 respectively. The transmission layer 617 is a piezoelectric layer. In this embodiment, the transmission layer 617 is made of PVDF (Polyvinylidene Fluoride). The second electrode layer 616 and the third electrode layer 618 apply voltage to the transmission layer 617. The transmission layer 617 vibrates and generates acoustic wave under the voltage. In this embodiment, the acoustic wave is ultrasonic wave.

The first electrode 611 is formed on the reception layer 612. The reception layer 612 is a piezoelectric layer. In this embodiment, the reception layer 612 is made of PVDF (Polyvinylidene Fluoride). The reception layer 612 receives an acoustic wave reflected by a finger put on the fingerprint identification unit 610 and generates electrical signal according to the acoustic wave. The first electrode 611 transmits the electrical signal to the transistors 614a. The transistors 614a receive the electrical signal from the first electrode 611, and make finger images according to the electrical signal.

While the fingerprint identification unit 610 works, the second electrode layer 616 and the third electrode layer 618 apply voltage to the transmission layer 617, then the transmission layer 617 vibrates under the voltage and generates acoustic wave. When a finger is put on the fingerprint identification unit 610, the acoustic wave is reflected by the finger and transmits to the reception layer 612. The reception layer 612 generates electrical signal according to the reflected acoustic wave and transmits the electrical signal to the transistors 614a, and then the transistors 614a obtain finger images according to the electrical signal.

In this embodiment, the first electrode layer 611 and the third electrode 618 are transparent conductive layers. Particularly, the first electrode layer 611 and the third electrode 618 can be made of monolayer transparent conducting materials or multilayer transparent conducting materials. The monolayer transparent conducting material includes ITO (Indium Tin Oxide), ZnO (Zinc Oxide), PEDOT (Polyethylenedioxythiophene), CNT (Carbon Nanotube), AgNW (Argentum Nano Wire), or graphene. The multilayer transparent conducting material includes a multilayer structure with successively stacked ITO, Argentums, and ITO. The first electrode layer 611 is formed on the reception layer 612. The second electrode layer 616 is made of opacity conducting material, such as Argentums. The second electrode layer 616 and the third electrode layer 618 are positioned at two opposite sides of the transmission layer 617 respectively. In this embodiment, a luminousness of each of the first electrode layer 611 and the third electrode 618 is between 10% and 99%, and an impedance of each of the first electrode layer 611 and the third electrode 618 is less than 150 Ohm.

Because the first electrode layer 611 and the third electrode 618 are transparent layers, a manufacturer can easily see the particles and bubbles inside the fingerprint identification unit 610, and then remove the particles and bubbles by suitable means.

The embodiments shown and described above are only examples. Many details are often found in the art such as the other features of a touch device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A fingerprint identification unit, comprising:
a substrate;
a reception layer positioned at one side of the substrate;
a first electrode layer formed on the reception layer;
a transmission layer positioned at another side of the substrate opposite to the reception layer; and
a second electrode layer and a third electrode layer formed on two opposite sides of the transmission layer respectively;
wherein the reception layer and the transmission layer are made of piezoelectric materials; at least one of the first electrode layer, the second electrode layer, and the third electrode layer is a transparent conductive layer; the transmission layer is positioned between the second electrode layer and the third electrode layer; the second electrode layer and the third electrode layer are configured to apply voltage to the transmission layer; the transmission layer is configured to vibrate under voltage and generate acoustic wave.

2. The fingerprint identification unit of claim 1, wherein the second electrode layer is positioned between the substrate and the transmission layer; the third electrode layer is positioned on one side of the transmission layer away from the second electrode layer; the third electrode layer is a transparent conductive layer.

3. The fingerprint identification unit of claim 2, wherein the second electrode layer is a transparent conductive layer.

4. The fingerprint identification unit of claim 1, wherein the first electrode layer is a transparent conductive layer.

5. The fingerprint identification unit of claim 1, wherein the transparent conductive layer is made of monolayer transparent conducting materials.

6. The fingerprint identification unit of claim 5, wherein the monolayer transparent conducting material is one of ITO (Indium Tin Oxide), ZnO (Zinc Oxide), PEDOT (Polyethylenedioxythiophene), CNT (Carbon Nanotube), AgNW (Argentum Nano Wire), and graphene.

7. The fingerprint identification unit of claim 1, wherein the transparent conductive layer is made of multilayer transparent conducting materials.

8. The fingerprint identification unit of claim 7, wherein the multilayer transparent conducting material is a multilayer structure with successively stacked ITO, Argentums, and ITO.

9. The fingerprint identification unit of claim 1, wherein the reception layer and the transmission layer are made of PVDF (Polyvinylidene Fluoride).

10. The fingerprint identification unit of claim 1, wherein the substrate comprises a number of transistors.

11. A fingerprint identification device, comprising:
a fingerprint identification unit, comprising:
a substrate;
a transmission layer positioned at one side of the substrate, and configured to generate an acoustic wave;
a reception layer positioned at another side of the substrate opposite to the transmission layer, and configured to receive the acoustic wave reflected by an object put on the fingerprint identification unit; and
at least one transparent conductive layer functioning on at least one of the reception layer and the transmission layer; and
a connection pad coupled between the fingerprint identification unit and external circuits;
wherein the at least one transparent conductive layer comprises a second electrode layer formed on one side of the transmission layer, and a third electrode layer formed on the other side of the transmission layer opposite to the second electrode layer; the transmission layer is positioned between a second electrode layer and a third electrode layer; the second electrode layer and the third electrode layer are configured to apply voltage to the transmission layer; the transmission layer is configured to vibrate under voltage and generate acoustic wave.

12. The fingerprint identification device of claim 11, wherein the at least one transparent conductive layer further comprises a first electrode layer formed on the reception layer and functions on the reception layer, the second electrode layer, and the third electrode layer are non-transparent conductive layer.

13. The fingerprint identification device of claim 11, wherein the fingerprint identification unit further comprises a non-transparent conductive layer applied on the reception layer and configured to transmit electrical signals to function on the reception layer.

14. The fingerprint identification device of claim 11, wherein the at least one transparent conductive layer further comprises an electrode layer applied on the reception layer, and the electrode layer applied on the reception layer is configured to transmit electrical signals to function on the reception layer.

15. The fingerprint identification device of claim 11, wherein the at least one transparent conductive layer is made of monolayer transparent conducting materials.

16. The fingerprint identification device of claim 15, wherein the monolayer transparent conducting material is one of ITO (Indium Tin Oxide), ZnO (Zinc Oxide), PEDOT (Poly-ethylenedioxythiophene), CNT (Carbon Nanotube), AgNW (Argentum Nano Wire), and graphene.

17. The fingerprint identification device of claim 11, wherein the at least one of the transparent conductive layer is made of multilayer transparent conducting materials.

18. The fingerprint identification device of claim 17, wherein the multilayer transparent conducting material is a multilayer structure with successively stacked ITO, Argentums, and ITO.

19. The fingerprint identification device of claim 11, wherein the reception layer and the transmission layer are made of PVDF (Polyvinylidene Fluoride).

* * * * *